April 21, 1970 W. T. MAYS ET AL 3,507,105
HARVESTING APPARATUS
Filed Dec. 9, 1966 4 Sheets-Sheet 1
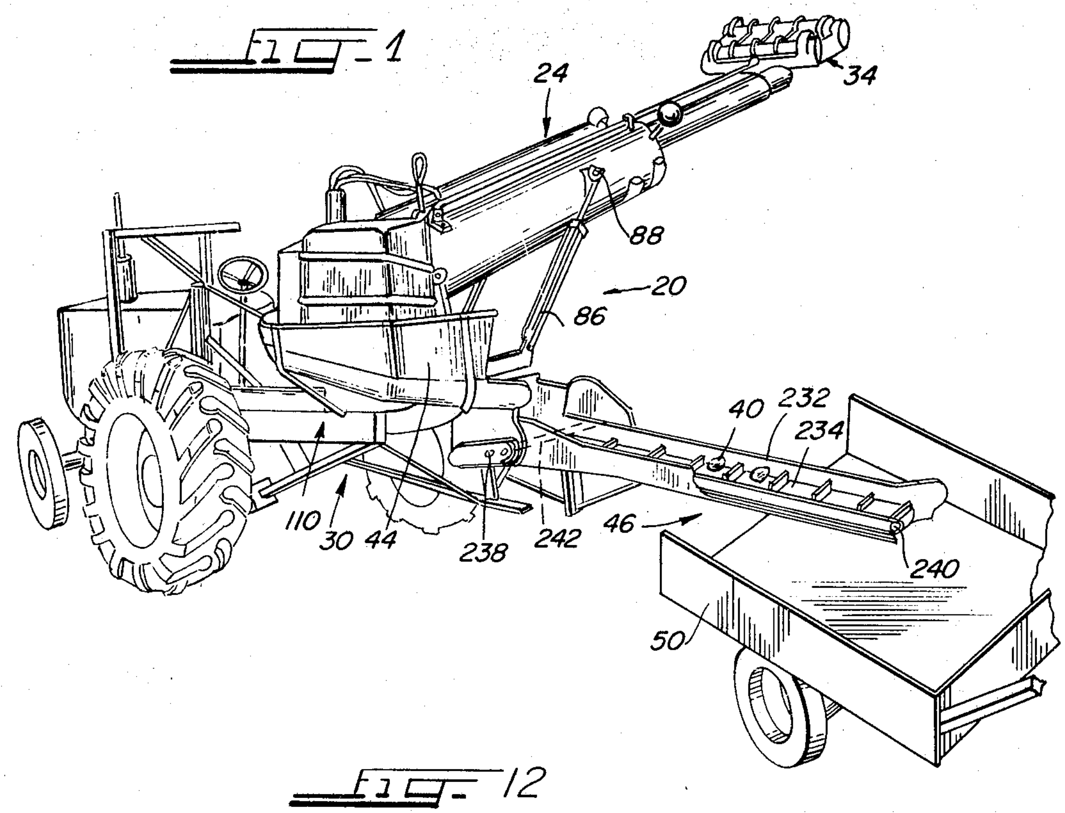
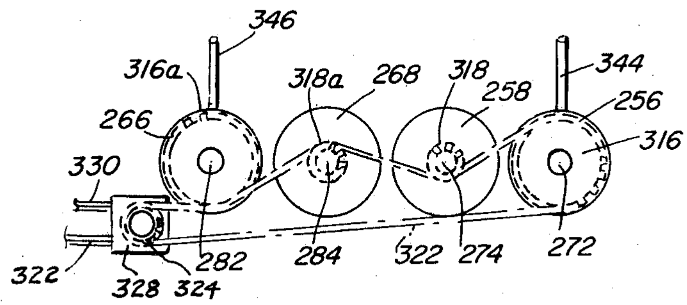
INVENTORS.
WILLIAM T. MAYS
JOHN C. MAYS
BY
Kegan, Kegan & Berkman
ATTYS.

HARVESTING APPARATUS
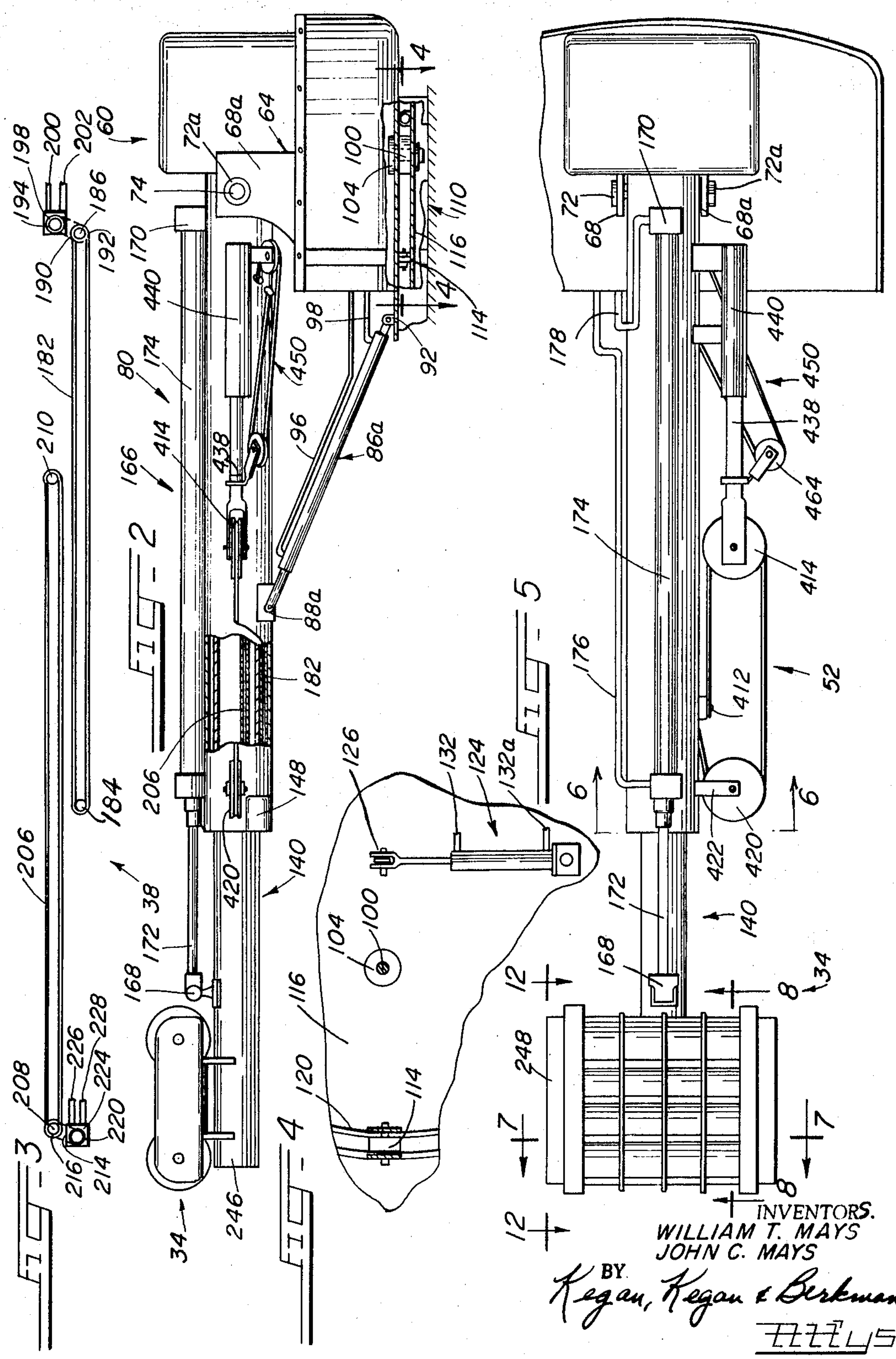
INVENTORS.
WILLIAM T. MAYS
JOHN C. MAYS
BY
Kegan, Kegan & Berkman
ATTYS.

HARVESTING APPARATUS
Filed Dec. 9, 1966 4 Sheets-Sheet 3
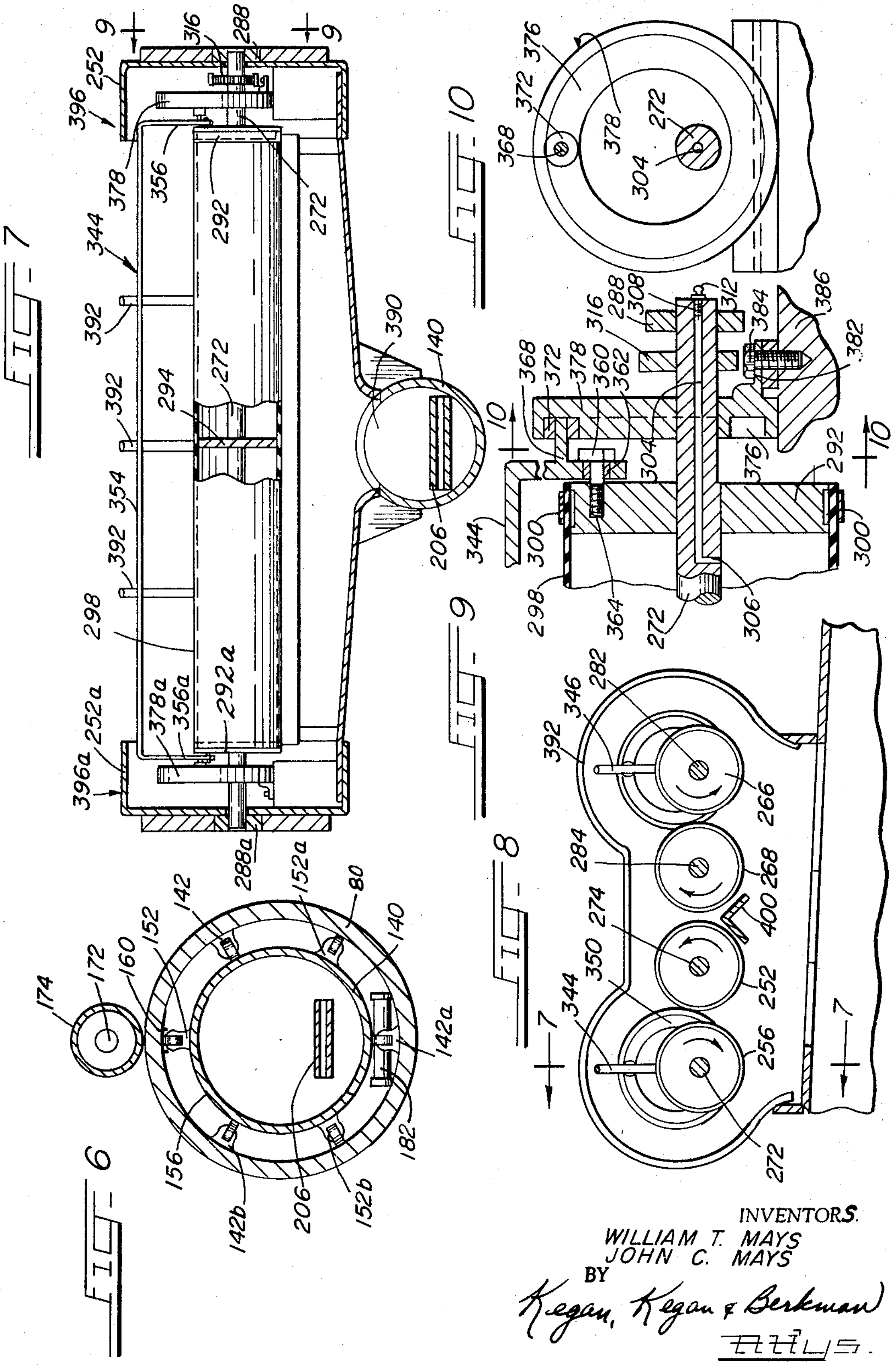
INVENTORS.
WILLIAM T. MAYS
JOHN C. MAYS
BY
Kegan, Kegan & Berkman
ATTYS.

HARVESTING APPARATUS
Filed Dec. 9, 1966 4 Sheets-Sheet 4
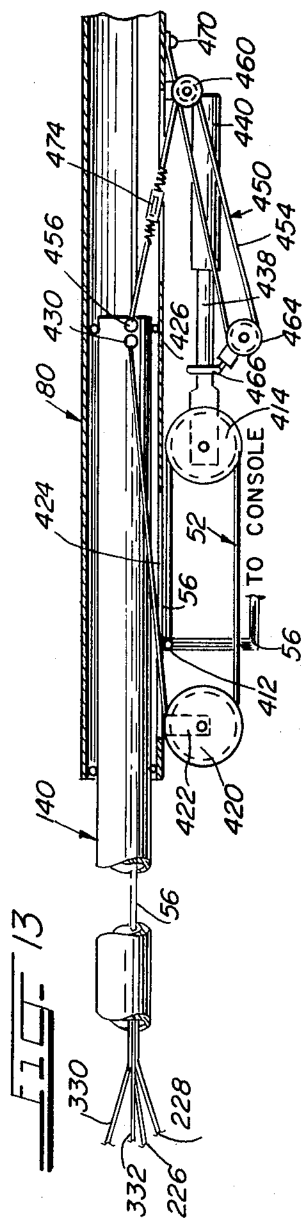
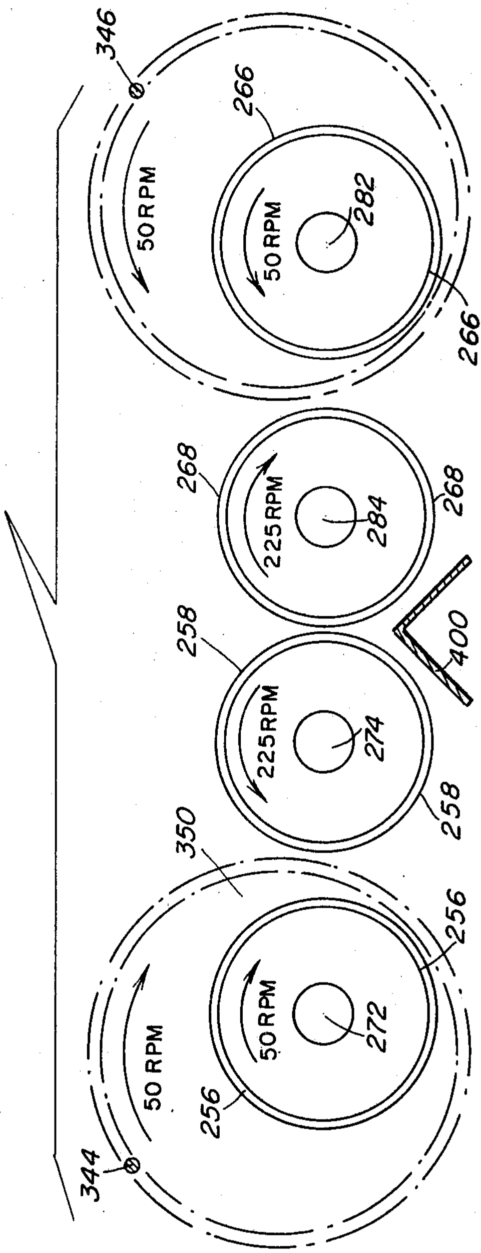
INVENTORS.
WILLIAM T. MAYS
JOHN C. MAYS
BY Kegan, Kegan & Berkman
Att'ys.

United States Patent Office 3,507,105

Patented Apr. 21, 1970

3,507,105

HARVESTING APPARATUS

William T. Mays and John C. Mays, Vero Beach, Fla., assignors to Cooper-Mays Harvester, Inc., Vero Beach, Fla., a corporation of Florida Filed Dec. 9, 1966, Ser. No. 600,410
Int. Cl. A01g *19/08*
U.S. Cl. 56—328 31 Claims

ABSTRACT OF THE DISCLOSURE

A mechanized harvesting apparatus for picking fruit and having a picker head including a gathering bar for directing fruit and fruit-laden branches to a picking zone adjacent parallely disposed, oppositely rotating picking rollers or picking discs of the picker head. The picker head is supported on an extensible and retractable boom assembly which carries conveying means for delivering picked fruit to a collector trough. A power line reel system carried by the boom assembly prevents formation of power line slack as the boom extends and retracts.

This invention relates to highly mechanized harvesting equipment. More particularly, the invention is directed to improved apparatus finding utility in the picking of fruit, or similar products, from trees, bushes, and the like. In one preferred embodiment of the invention, the mechanized apparatus is useful in the harvesting of citrus fruits.

The picking or the physical removal of fruit from trees without bruising and without otherwise adversely affecting the fruit has long been a tedious, time-consuming, and expensive process which has materially contributed to the high cost of the product to the ultimate consumer. A conventional and common harvesting procedure has been to pick the fruit by hand either by pulling the fruit from the stem or by manually cutting the supporting stem and then depositing the fruit in a suitable receptacle. It is apparent that hand picking methods, which require experienced workers, are not only laborious but are also very time-consuming.

While to persons not familiar with the harvesting of citrus fruits, hand picking or manual harvesting of fruit may seem to be a simple and rapid method, persons experienced in this specialized area of agriculture will be aware of unique and solution-defying problems. For example, in the proper picking of citrus fruit one does not simply exert a straight pull in a direction paralleling the axis of the twig on which the fruit is supported or attached. Such a procedure frequently results in the pulling out of a portion of the peel along with the button or calyx, in which case decay is likely to set in. This damaging of the fruit is called "plugging." It has been found that plugging is avoided or greatly minimized by combining a twisting action with the pulling. That is, the fruit is twisted at an angle to the twig, jerked sharply downwardly, and removed.

Various mechanical and semi-mechanical systems for the picking of fruit have been proposed in the prior art, but none has dealt effectively with all of the existing problems, and each system suffers from one or more deficiencies or includes one or more objectionable features. Some of the prior art apparatus has been found incapable of handling the fruit sufficiently gently to prevent damage or bruising, even when resilient materials such as sponge rubber have been employed as the fruit-contacting media.

Prior art equipment which provides a solution to the problem of mechanically plucking citrus fruit from trees without causing damage to the fruit is described in Mays and Mays U.S. Patent No. 3,138,912. While the structure and the techniques disclosed in that patent are useful and effective for their intended purpose, it has been found that the apparatus is undesriably slow in operation, lacking the requisite speed to be commercially attractive as a replacement for hand picking. It is, therefore, the aim of the present invention to provide an improved harvesting apparatus combining the advantages of both rapid operation and careful handling, whereby the harvester may be effectively and economically employed.

It is a principal object of the present invention to provide an improved apparatus for the picking or harvesting of fruit or similar products from trees, bushes and the like, which apparatus may be effectively and efficiently operated by one man, and which will carefully and rapidly remove the fruit from its natural support without damage to either the fruit itself or to the support.

A related object of the invention is to provide a harvesting apparatus which is not only readily mobile, or ambulant, but which is preferably self-propelled, whereby the harvester may be moved quickly and easily from place to place or from tree to tree as required.

Yet another object of the invention is to provide a harvesting apparatus which includes power means for efficiently and rapidly manipulating and accurately positioning an extensible boom which carries a novel picker head at its forward extremity.

Another feature of the invention is that it includes power means for effecting extension and retraction of the picker-heads-supporting boom.

It is another object of the invention to provide mechanically driven conveying means for transporting picked fruit from the picker head to a receptacle, box, or bin.

A related object of the invention is to provide fruit conveying means within the structure of the boom itself.

Another important object of the invention is to provide a reel system or reeling system which functions as power line takeup and payout means and which is automatically operable during both extension and retraction of the boom to prevent the development of undesirable slack in the power lines.

Still another object of the invention is to provide a power driven conveyor to transport fruit from an exit end of the boom to a fruit-receiving receptacle or container.

Another object of the invention is to provide in an improved fruit picker head a pair of cooperating resilient rollers or tubes disposed in parallel array and rotatable in opposite directions and at different or differential speeds to grip and to twist fruit and thereby to remove the fruit from the tree.

A very important feature of the invention is the provision, for cooperation with the picker head, of a fruit collecting or gathering bar supported to move in an orbit about one of the picking rollers and effective to reach outwardly to clear tree limbs and to engage fruit or fruit-supporting branches of the tree, to sweep and direct the fruit and fruit-laden branches toward the rollers of the picker head, and, finally, to bring the fruit into engagement with the picking rollers. The gathering bar completes its circuit path, passing between the picking rollers and clearing twigs and leaves from the picking zone.

A related object of the invention is to provide guard bars extending generally transversely of and above the picking rollers and effective to deflect tree branches and to orient fruit for engagement by the picker head rollers.

It is a further object of this invention to provide a fruit harvesting apparatus having the features described above and further characterized by ruggedness, simplicity, and ease of operation.

In a descriptive sense, it is the aim of the present invention to provide a fruit harvesting assembly or device which is maneuverable, power-driven readily and precisely positionable, which mechanically grips, twists, and pulls selected fruit for detachment from a tree support, and which then conveys the fruit to a suitable receptacle. Additional important specific features of the harvesting device include a gathering bar which functions to direct fruit into a zone adjacent cooperating rollers of the picker head and to clear the zone of twigs and leaves, and a reeling system or powerline takeup and payout system automatically operable to eliminate power line slack during extension and retraction of the boom assembly which carries the picker head.

The above and other objects, advantages, and features of the subject invention will be obvious or will become apparent from a consideration of the following detailed description and the application drawings.

In the drawings:

FIGURE 1 is a perspective view of a harvesting apparatus embodying the elements of the invention;

FIGURE 2 is a side elevational view of the boom assembly of the harvesting apparatus and its supporting base, with parts cut away, and showing the picking head and components of the reeling system;

FIGURE 3 is a side elevational view of the conveyor belts contained within the boom sections;

FIGURE 4 is a fragmentary view taken substantially on the line 4—4 of FIGURE 2 and showing pivotal means for moving the boom structure of the invention in horizontal arcs;

FIGURE 5 is a top plan view of the harvesting apparatus of the invention;

FIGURE 6 is a vertical cross-sectional view taken substantially on the line 6—6 of FIGURE 5 and showing a preferred means for slidably supporting the inner tube-like member within the outer tube-like member of the extensible boom assembly;

FIGURE 7 is a vertical cross-sectional view with parts cut away, taken on the line 7—7 of FIGURE 5 and showing a roller member and its associated gathering bar, both being components of the picker head of the invention;

FIGURE 8 is a cross-sectional view taken on the line 8—8 of FIGURE 5 and showing a preferred arrangement of the component elements of the picker head of the harvesting apparatus;

FIGURE 9 is an enlarged, fragmentary vertical cross-sectional view taken substantially on the line 9—9 of FIGURE 7 and showing details in the mounting of a picker head roller and an associated gathering bar;

FIGURE 10 is a cross-sectional view taken substantially on the line 10—10 of FIGURE 9 and showing the combination roller support plate and gathering bar cam of the picker head;

FIGURE 11 is a cross-sectional view of the picker head and depicting, schematically, preferred orbits of the gathering bars about the fruit picking rollers;

FIGURE 12 is a side elevational view of the picker head taken substantially on the line 12—12 of FIGURE 5, with cover parts removed to show the drive linkage of the picking rollers; and FIGURE 13 is a fragmentary bottom plan view of the boom assembly, with parts cut away, and providing a diagrammatic showing of the reeling system for the boom-carried cables or power lines.

Referring now to the drawings, and particularly to FIGURE 1, there is shown, for the purpose of illustrative disclosure, a preferred embodiment of the harvesting apparatus of the invention incorporating the features thereof. In the specific exemplary structure depicted, the harvester 20 includes a power-driven extensible and retractable boom assembly 24 mounted on a mobile conveyor 30 which is preferably a self-powered truck, tractor, or similar vehicle, but which may be a draft type mobile support adapted for attachment to a prime mover. A novel picker head 34 is carried on a forward end of the boom assembly, and, supported within and extending substantially the full length of the boom assembly 24 is an article-guiding or conveying assembly 38 illustrated diagrammatically in FIGURE 3. The conveying assembly is operable to carry fruit 40 through the boom asesmbly to a bin, depository chute, or collector trough 44 from which the fruit is discharged into a rearwardly or laterally extending power-driven conveyor assembly 46. The conveyor assembly 46 transports the fruit to any convenient trailer, box, or receptacle 50.

As seen most clearly in FIGURES 5, and 13 a reeling or reel system or assembly 52 mounted on the boom assembly 24 caries power lines 56 which extend between the picker head 34 at the forward end of the boom assembly and a boom support base 60 carried by the mobile unit 30. The boom assembly 24 is pivotally mounted on the boom support base 60 for controlling movement in vertical and horizontal arcs. While any of several suitable mounting and manipulating mechanisms may be used, in the preferred embodiment of the invention illustrated, for elevation adjustment the boom assembly is supported in a frame 64 fastened to the boom support base 60 and including a pair of vertically extending parallel plates 68 and **68*a*. Pivotal support for movement in a vertical arc is provided by a pair of opposed bearings 72 and 72*a* carried by the plates 68 and 68*a* and which serve as pivotal mounts for short bearing stub shafts 74 attached to and extending laterally of the lower or main boom section 80** near the rear end thereof.

Power to effect controlled elevation of the boom assembly 24 is applied through a pair of hydraulic cylinder and piston assemblies 86 and **86*a* pivotally fastened at their respective forward ends 88 and 88*a* to opposed sides of the main boom section 80 forwardly of its pivot point 74. At their respective opposite ends the boom-elevating hydraulic assemblies 86 and 86*a* are pivotally connected to a pair of laterally spaced flanges 92 fastened to the frame 64 of the boom support base. Hydraulic fluid for actuating the assemblies 86 and 86*a* is supplied through hydraulic lines 96 and 98** through which the hydraulic fluid is transmitted by means of a hydraulic motor or pump (not shown) in a manner well-known to those skilled in the art.

The boom support base 60 is carried on a swivel mechanism which comprises, in the embodiment of the invention illustrated a ball-bearing spindle 100 supported in a housing 104 which is in turn attached to a base frame 110 the latter being welded, bolted, or otherwise securely fastened to the mobile unit 30, which may be a tractor, a truck, or any equivalent machine. Additionally, the swivel assembly includes one or more rollers or wheels 114 mounted on the underside of the floor 116 of the boom support base 60, for rotation in a vertical plane. The wheel 114 rides in a track 120 which defines a circular path on about an 18" radius with respect to the spindle center point. Rotational movement of the boom support base 60 and the boom assembly 24 carried thereon is conveniently achieved, as illustrated in FIGURE 4, through a piston and cylinder assembly 124 fastened at one end 126 to the underportion of the boom frame mount and fastened at its other end 130 to the base frame 110, the hydraulic assembly 124 being aligned to provide horizontal swinging or rotating control of the boom support base through an appreciable arc. Hydraulic fluid is supplied to the cylinder of the piston and cylinder assembly 124 through hydraulic lines 132 and **132*a* in the usual manner. Thus, through combined and controlled action of hydraulic assemblies 86, 86*a* and 124,** the main boom may be swung through a vertical arc and through a horizontal arc to any required position.

Substantially coaxial with and slidably disposed within the main boom section 80 and supported for telescopic movement with respect thereto is a second or inner boom section 140. Radial support and spacing of the inner boom 140 within the outer boom 80 is conveniently provided by two sets of roller bearings, as shown in FIG- URE 6. The first set 142, **142*a* and 142*b* is fastened to and projects radially inwardly of the inner wall surface 144 of the outer boom 80 at its forward end 148. The second set of bearings 152, 152*a* and 152*b* are fastened to and extend radially outwardly of the outer wall surface 156 of the inner boom 140 at a rearward end 208 thereof. In each case, the three bearings are spaced 120° apart about the circumference of the boom members. Moreover, with respect to one another, the two sets of bearings are staggered angularly about 60° of arc to provide a balanced and symmetrical configuration as indicated schematically in FIGURE 6. Also, as indicated in FIGURE 6, the upper bearing 152 carried by the inner lifter 140 rides within a longitudinally extending guide track 160** extending along the inside upper surface of the main boom. This bearing and track cooperate to preclude relative angular rotation of the two boom sections with respect to one another.

Forward and rearward reciprocal telescopic movement of the inner boom 140 within the outer boom 80 is effected by means of a piston and cylinder assembly 166 generally paralleling the axis of the boom sections. The assembly 166 is fastened at its forward end to a forward portion 168 of the inner boom 140. At its rearward end 170 the hydraulic assembly 166 is fastened to the outer boom 80 at its end near the base 60 upon which the boom assembly 24 is supported. Hydraulic fluid is furnished to the boom extending and retracting piston and cylinder assembly 166, including a rod 172 and a cylinder 174 through hoses or conduits 176 and 178 connected, in the usual manner, to a hydraulic motor or pump (not shown).

An endless pulley or belt 182 is disposed within and extends along substantially the entire length of the outer or principal boom 80. As indicated schematically in FIGURES 2 and 3 the endless pulley belt 182 is trained about and supported at its opposed extremes on a pair of longitudinally spaced horizontally supported rotatable shafts or bearings 184 and 186 which extend transversely of and are mounted within the main boom section 80 to support the belt 182 at a position well below the horizontal center of the boom section 80 so as to provide a maximum of headroom above the belt 182.

The belt 182 is conveniently driven by means of a drive chain or belt 190 trained about a sprocket gear 192 fastened on the shaft 186 and a second sprocket or gear 194 driven through a hydraulic motor 198 fed by conduits 200 and 202.

A second endless belt 206, with suitable cross lags or cross bars attached, is similarly supported in the forward boom section 140 on a pair of longitudinally spaced forward and rearward horizontally extending rotatable shafts 208 and 210 so that the belt 206 extends substantially for the full length of the boom section 140. A drive belt or chain 214 is trained over a sprocket gear 216 fastened on the shaft 208 and a second sprocket gear 220, the latter being driven through a hydraulic motor 224 fed by fluid lines 226 and 228.

As viewed in side elevation and as indicated schematically in FIGURES 2 and 3 the conveyor belt 206 supported within the forward or inner boom section 140 is positioned to overlie the second conveyor belt 182 supported within the main or outer boom section 80. With the overlying belt positioned within the boom assembly of FIGURE 2, in the manner illustrated schematically in FIGURE 3, those belts rotate clockwise so that fruit deposited on the forward belt 206 is carried rearwardly and dropped onto the second belt 182 which carries the fruit to the trough or bin 44 positioned below the rear end portion of the conveyor 182. The collector trough 44 which is attached to the base frame 110 is sloped downwardly and to one side, as indicated in FIGURE 1, so that fruit delivered through the boom assembly and deposited in the trough 44 rolls by gravity and empties into the final conveyor assembly 46. The final or the rear conveyor comprises an elongated trough 232 with sloping sidewalls. Supported within and extending substantially the full length of the elongated trough 232 is a driven endless conveyor belt 234 trained about pulley guides 238 and 240 at opposed ends of the conveyor assembly 46. At its point of connection to the base frame 110 conveyor assembly 46 is pivotally mounted on a horizontally extending shaft or support rod 242 so that the end height of the conveyor 46 may be adjusted to any desired position. The conveyor belt 234 is driven by means of a hydraulic motor and associated linkage and conduits (not shown) in the manner previously described. Fruit 40 discharged from the conveyor 46 is deposited in a trailer, packing boxes, baskets, or other suitable receptacles 50, as indicated schematically in FIGURE 1.

As illustrated in FIGURES 2 and 5, the picker head 34, which includes cooperating pairs of rollers or disc assemblies, is carried at the forward end 246 and overlies the forward or inner boom section 140. The picker head 34 itself includes a roller-carrying frame or housing 248. A plurality of resilient elements, which are preferably pressurized pneumatic rollers or discs disposed in a substantially parallel array to extend transversely of the boom section 140, are rotatably supported at opposed side walls 252 and **252*a* of the frame 248**, as illustrated in FIGURE 7. Any preferred roller support means and roller drive means may be employed. However, for illustrative purposes, a preferred structural arrangement is shown.

For reasons which will become apparent as the description proceeds, the pneumatic rollers or tubes of the picker head operate in cooperating pairs, and a single pair of such rollers constitutes a functional unit. However, in the preferred form of the invention illustrated, and as seen in FIGURES 5, 8, and 11, the picker head 34 of the illustrative embodiment disclosed includes two pairs or two sets of rollers 256 and 258 and 266 and 268. The rollers of each cooperating pair rotate in opposite directions and preferably at different angular speeds. As indicated schematically in FIGURE 11, the speed of rotation of the faster moving picker head tube 258 is about 4 times that of the slower revolving tube 256. It will, of course, be recognized that this speed ratio is not critical and that in a given situation other ratios may be preferred. The method of supporting the rollers does not differ substantially from roller to roller and, accordingly, a brief description of the mechanism associated with a given roller and illustrated in FIGURE 9, will suffice.

Referring now to FIGURES 7 and 9, the roller 256, which is hollow and generally cylindrical in form, includes a horizontally extending shaft 272 rotatably journalled at opposed ends in suitable bearings 288 and **288*a* carried by the corresponding sidewalls 252 and 252*a* of the picker head frame 248. Fixedly fastened to the shaft 272 axially inwardly of opposed bearing supports 282 and 282*a* is a pair of circular end plates or discs 292 and 292*a*, each carried on the shaft 272 transversely thereof for rotation therewith, the shaft passing through the center of each disc. A third, preferably somewhat thinner disc or plate 294 having essentially the same diameter as the plates 288 and 288*a* is fastened on the shaft 272 at an axial position substantially midway between the points of attachment of the plates 288 and 288*a***.

Strong flexible sheet material 298 which may be natural or synthetic rubber or any suitable plastic material such as polyethylene, polypropylene, vinyl composition, or others, is fastened to the end plates 292 and **292*a* to extend therearound and thereby to define a tube. Metal bands 300 encircle the end plates, as shown in FIGURE 7, and provide a convenient means for attachment of the plastic sheet material 298 thereto. It will be evident that the third disc or plate 294 constitutes an auxiliary support for the flexible sheet material 298**.

In use, the tubular picking members 256 and 258 are preferably pressurized, and to this end, each shaft 272 is provided with an axial bore or channel 304 extending nwardly of an end of the shaft and communicating with a transversely extending radial bore 306 communicating with the interior of the tube member 256. The outer end portion of the internal wall defining the axial bore 304 is threaded 308 to receive a tire-type valve fitting 312 by means of which air may be introduced into the interior of the tube 256. Neither the length nor the diameter of the pneumatic rolls or cylinders of the picking head is critical, the particular dimensions being dictated by several variables related both to the type of fruit being picked and to particular specific features of a given picker head. In the specific embodiment of the picker head illustrated, the pneumatic rollers are about 28 inches in length and about 4¾ inches in diameter, and the wall thickness of the tubes is about $\frac{3}{16}$ inch.

The pneumatic tubes or rollers 256 and 258 may be driven by any preferred means, such as through sprockets or gears 316 and 318 (and 316*a* and 318*a*) fastened onto the end portion of the respective shafts 272 and 274 (and 282 and 284) of the corresponding rollers. The sprockets 316 and 318 of adjacent cooperating rollers, as illustrated in FIGURE 12, are of different diameters so that the drive chain or belt 322 actuated through a drive gear 324 will rotate the picking tubes 256 and 258 at different or differential speeds, convenient speeds for the particular tubes described being about 50 r.p.m. for the slower (256) and about 225 r.p.m. for the faster (258). The drive gear 324 is itself driven by means of a hydraulic motor 328 fed by fluid conduits 330 and 332. The speed of rotation of the picking rolls as well as the speed of extension and retraction of the boom assembly is controlled by means of adjustable flow valves mounted on a console (not shown) and manipulated by the operator of the machine. The operator's seat swivels from a normal driving position to the console so arranged as to allow one operator to control all functions of the machine.

While the oppositely revolving cooperating rollers 256 and 258 of the picker head are reasonably effective for the intended purpose of picking tree-supported articles such as citrus fruit, and notwithstanding the fact that the structure described above is greatly superior to prior art mechanisms, it is an important and novel feature of the present invention that the speed, effectiveness, and reliability of the picker head is greatly enhanced through the use of an auxiliary cooperating element which is hereinafter referred to as a gathering bar or collecting bar. Whereas a given pair of cooperating reversely rotating pressure-responsive rollers, revolving at different speeds, is effective to grasp and twist fruit and thereby effectively to separate the fruit from the supporting tree without damage to either the tree or the fruit, the role of the gathering bar is to reach outwardly beyond the physical radial limits of the rollers and then to swing in an orbital path so as to direct tree-supported fruit into the laterally and downward extending zone between two cooperating rollers so that the fruit may be engaged thereby and plucked from its support.

A separate gathering bar 344 and 346 is associated with each pair of cooperating roller systems. Since paralleling operations are involved in each case, it will suffice for purposes of disclosure to describe the gathering bar and its mode of operation with reference to one roller pair 256 and 258. The gathering bar 344 is illustrated in FIGURES 7 and 9, and a diagrammatic representation of the orbital path traversed by the bar is shown in FIGURE 11. The path travelled by the gathering bar 344 is generally circular and that as the elongated bar sweeps its circuit it circumscribes a cylinder about the slower (256) of the two cooperating rollers. It will be further observed that the orbital path swept by the gathering bar is eccentric with respect to the outer surface of the roller 256, that the radius of the path followed by the gathering bar is greater than the radius of the cylindrical tube 256, and that the axis of the cylinder of revolution defined by the sweeping of the gathering bar is shifted upwardly and preferably somewhat outwardly with respect to the axis of the cylinder 256. In executing its orbital path the gathering bar approaches the zone 350 between the two cooperating rollers 256 and 258 from above the rollers.

It is an important feature of the invention that the gathering bar executes its path about the slower revolving of the two cooperating rollers. The advantages of this arrangement will become apparent as the description proceeds. In the light of the present disclosure it will be evident to those skilled in the art that the path swept by the gathering bar need not be circular and that other orbits, for example elliptical, may be used. It is also readily apparent that many structural arrangements may be utilized in order to effectuate the collecting and sweeping of the gathering bar. For purposes of illustrative disclosure, but not by way of limitation, one suitable mechanical arrangement is illustrated in the drawings, (FIGURES 7, 8 and 9) and is described briefly below.

Referring now to FIGURES 7 and 9, the gathering bar 344 of the invention is shown as comprising a generally U-shaped element including an elongated laterally extending rod 254 having a pair of transversely extending parallel arms 256 and 256*a* at opposed ends. The arms are pivotally connected to and supported upon corresponding rotatable end plates 292 and 292*a* of the roller 356. A threaded bolt 360 extends through a bushing 362 carried by the arm 356 and, the threaded end 364 of the bolt 360 is fastened into the end plate 292 as best seen in FIGURE 9. Fastened to and extending laterally outwardly of and transversely of the opposed arms 356 and 356*a* at points intermediate the pivotal bolt connection 360 and the rod 354 are parallel and in-line bosses or stub shafts 368 and 368*a*. The stub shafts are sleeved within bearings 372 and 372*a* the latter being received axially into an annular groove 376 and 376*a* formed inwardly of a facing surface of corresponding vertically extending fixed plates or cams 378 and 378*a* fastened to and supported upon the picker head frame 248. As shown in FIGURE 9, the cam 378 is provided with a flange 382, and a bolt 384 anchors the flange to a frame member 386. In the arrangement described, the bearing 372 which rides in the groove 376 serves as a cam follower and as the roller 256 and its end plates 292 and 292*a* revolve, the rod 354 of the gathering bar 344 revolves about the tube 256 describing a path as illustrated in FIGURE 11. That is, the rod 354 of the gathering bar 344 moves outwardly and upwardly of the tube 256 and then returns inwardly and downwardly as it approaches the zone 350 between the tubes 256 and 258. As the rod 354, which rotates at the same angular velocity as the tube 256, brings fruit into the zone 350 between the tubes 256 and 258 the fruit gathered by the bar will be "ahead" of and will lie below the bar as the bar approaches the zone 350. As the fruit finally comes into contact with the more rapidly moving picking roller 258, that roller accelerates the downward movement of the fruit with respect to the slower rotation of the bar 344 so that the fruit is moved away from the rod 354 to prevent fruit damage which might otherwise result. The fruit entering the zone 350 and engaging the cooperating rollers is twisted and pulled, thereby being freed from the supporting tree and is then released to drop upon the conveyor belt 206 within the forward boom section 140. As indicated in FIGURE 7, a top wall portion of the boom section 140 is cut away 390 to provide a fruit entry area. In effect, the gathering or collecting bar 344 collects and brings the fruit to the picking rollers and then effectively retracts during the actual picking step.

As the picker head 34 is extended into the tree area to gather and pick the fruit, it is inevitable that the head assembly will brush against or otherwise come into contact with tree branches. Accordingly, the picker head 34 is provided with a plurality of guard bars 392 which serve not only to deflect tree branches but also as fruit orienting means. Referring to FIGURE 7, it will be seen that the center guard bar serves an additional important function. That is, the guard bar 392 overlies the picking tube center support plate 294 and prevents fruit from entering the fruit pickup zone 350 at this precise position. It will be understood that the roller 256 lacks its normal resilience at the point at which the center plate 294 supports the rubber or plastic sheet material 298. If it is desired to use still additional radial support plates, the positions of these are conveniently correlated with cerresponding positions of other guard bars. Shields 396 and 396*a* are also provided at either end of the picking tube structures to prevent fruit from engaging the rollers adjacent the rigid end plates 292 and 292*a*. In addition, a baffle 400 which, as seen in FIGURE 8 is generally L-shaped in section, is supported below and extends laterally across the picker head beneath the center tubes 258 and 268 to prevent fruit from passing upwards between these rollers.

From the foregoing description it will be evident that because of the telescoping arrangement of the forward or inner boom within the outer or rearward boom section there must be provided some means by which the power lines or cables, whether electrical or hydraulic, may accommodate the changes in the over-all length of the assembly. For the specific illustrative embodiment of the invention described, power must be furnished to two hydraulic motors carried by the telescoping boom. These motors are the picker head motor 328 and the conveyor belt motor 224 which drives the belt 226 supported within the boom section 140. An important feature of the present invention is a highly novel and useful reel system illustrated diagrammatically in FIGURES 2 and 13. The system is remarkably simple yet highly effective to maintain the power lines under constant and controlled tension and to pay out and retract the lines, as required, during reciprocation of the inner boom section 140 within the outer sleeve boom 80. The manner in which extension and retraction of the power lines are achieved is described below.

Referring to FIGURE 13, the power lines 56 which originate at the console and which ultimately feed lines 226 and 228 connected to the belt drive motor 224 and lines 330 and 332 connected to the picker head drive motor 328 are firmly anchored or clamped by means of a suitable cleat or fixture 412 at a point near the front of the outer boom 80. From their point of attachment 412 to the boom section 80 the power lines 56 extend rearwardly along the boom section and engage and pass about a pulley wheel 414 of the first pulley system 52. The lines 56 then return toward the front door of the main boom section 80, passing around a second pulley wheel 420 fastened to the boom section 80 by means of a bracket 422. Passing through an opening 424 in the wall 426 of the boom section 80 and extending rearwardly to the rear of the inner boom section 140 the lines 56 are fastened by a suitable clamp 430 and then travel forwardly along the inner boom 140, finally being anchored at the forward end of the inner boom section 140. Angle irons carried on the boom section 140 provide additional support for the power lines. Suitable leads 226 and 228 connect the power lines to the conveyor belt 206 drive motor 224 and to the picking head drive motor 328.

Referring now in greater detail to the arrangement of the first pulley system 52, the pulley wheel 414 is rotatably carried on a rod 438 which is itself reciprocably slidable forwardly and rearwardly in a supporting tubular sleeve 440, the forward and rearward movement of the rod 438 generally paralleling and correlated with movement of the inner boom section 140 within the boom section 80. A second pulley system 450 is coupled to the pulley wheel 414, under controlled tension, to effect pay out and take up of power line, as required, so that the line always remains taut. The method of operation of the second pulley system 450 is described with reference to FIGURE 13. A cable 454, which is conveniently a steel lined cord, anchored at one end 456 to the rear of the inner boom section 140 is trained about a pulley wheel 460 attached to the main boom 80 and then engages a second pulley wheel 464 which is fastened to the sliding rod 438 by means of a suitable clamp 466. The other end of the cable is securely fastened at 470 to the rear of the main boom section 80. Through this simple and novel arrangement, the pulley system 450 essentially constitutes the counterpart of the power line pulley system 52 to maintain proper tension on the power lines at all times. In operation, as the inner boom section 140 moves forwardly (FIGURE 13), the pulley wheel 414 is drawn rearwardly through the action of the cable 454 so that slack in the power lines 56, tending to form as the boom section 140 moves forwardly, is taken up. As the inner boom 140 retracts into the outer boom 80, the opposite condition occurs, the pulley wheel 414 moving forwardly to make extension of power line possible. During all operations, the requisite tension is maintained, a spring-loaded turnbuckle 474 providing any necessary minor adjustment.

As previously pointed out, the power means of the instant invention is not limited to any single structure and may conveniently be either all electric, all hydraulic, or a combination of the two systems. For purposes of illustrative disclosure, the preferred embodiment of the invention is herein described with reference to hydraulic power means.

The novel reel or reeling system of the invention may be utilized both with power lines comprising electrical cords and with power lines which constitute hydraulic fluid tubes. In the latter type system the harvesting apparatus includes suitable control valves and a fluid reservoir, these components being well-known in the art and needing no illustration or description herein. The mechanism will include the usual safety elements including a locking device for preventing downward movement of the boom assembly unless hydraulic power is provided. The hydraulic system also includes the usual filtering elements.

The control valves as well as adjustment and regulation mechanisms are installed in the console so arranged that when the operator is in position, all controls are accessible. For convenience, each control may be both foot and hand actuated, the speed of any component movement being controlled and limited by valves incorporated into the system.

The foregoing description and the drawings are given merely to explain and illustrate the invention and the manner in which it may be performed, and the invention is not to be limited thereto, except insofar as the appended claims are so limited, since those skilled in the art who have this disclosure before them will be able to make modifications and variations therein without departing from the scope and spirit of the invention.

What is claimed is:

1. A power-driven harvesting device adapted to remove detachable articles depending from a support, and comprising:

a maneuverable, extensible, and retractable boom assembly having an article entry area and an oppositely disposed article exit area, a mobile base for carrying said boom assembly, means mounting and supporting said boom assembly on said base during elevation, extension and retraction, and during turning of said boom assembly, power means for effecting and controlling extension and retraction of said boom assembly and for effecting and controlling elevation and turning thereof, article guide means carried by said boom assembly and extending substantially the full length thereof between said article entry and said article exit areas, an article picker head supported at a forward end of said boom assembly adjacent said article entry area, means for driving elements of said head to pick said detachable articles for delivery thereof through said entry area and to said article guide means, and means adjacent said article exit area for receiving said articles dispensed therethrough.

2. The device as set forth in claim 1 and further comprising power means for driving said article guide means for carrying articles along said boom assembly from said forward end thereof rearwardly.

3. The device as set forth in claim 1 wherein said boom assembly comprises substantially coaxial telescoping outer and inner tube-like members slidably supported one within the other for relative reciprocal movement.

4. A device as set forth in claim 1 wherein said article picker head comprises:

a frame, a first resilient member rotatably mounted on said frame, a second resilient member rotatably mounted on said frame adjacent and laterally of and coextensive with said first member, and wherein said drive means drives and rotates adjacent said members at different linear speeds, whereby an article engaged by and entering a zone adjacent said rotating resilient members is gripped and twisted thereby and detached from its support for deposit into said article entry area and for subsequent delivery to said article exit area.

5. The device as set forth in claim 4 wherein said first and said second resilient members are parallelly disposed rollers supported in an out-of-contact relation.

6. The device as set forth in claim 5 wherein said rollers are pneumatic rollers.

7. The device as set forth in claim 4 and further comprising means for rotating said first and second resilient members in opposite directions and at said different speeds.

8. The device as set forth in claim 4 wherein said first and said second resilient members comprise generally tubular elements.

9. The device as set forth in claim 5 and further comprising article gathering means supported adjacent said rollers and cooperating therewith to gather said articles and to guide said articles to said zone adjacent said rollers to facilitate harvesting of said articles.

10. The device as set forth in claim 9 wherein said article gathering means comprises bar means extending along the length of and generally parallel to said rollers, and guide means coupled to said bar means and controlling article gathering action thereof.

11. The device as set forth in claim 10 wherein said guide means comprises a cam, and a bar means carried cam follower guiding on said cam, said bar means being responsive to control exercised by said guide means to sweep a cyclical path about one of said rollers and adjacent thereto.

12. The device as set forth in claim 11 wherein a plane defined by said cyclical path of said bar means parallels a longitudinal axis of said one of said rollers.

13. The device as set forth in claim 11 wherein said bar means includes a rod supported to travel around said one of said rollers.

14. The device as set forth in claim 13 wherein said cam and cam follower cooperate to define an eccentric orbit for said bar means about said one of said rollers, and wherein in traversing said orbit said rod parallels but moves radially outwardly of said one of said rollers during an article-gathering sector of said orbit and moves radially inwardly and toward said one of said rollers during an article-picking sector of said orbit.

15. The device as set forth in claim 4 and further comprising:

a drive shaft rotatably supported in said frame, end plates disposed transversely on said shaft at opposed ends thereof and fixed on said shaft for rotation therewith, means fastening said first resilient member onto said end plates, article gathering means of generally U-shaped configuration and comprising an elongated principal rod extending parallel to and spaced axially from said shaft, and a pair of arms joined to and extending generally transversely of said rod at opposed ends thereof, means pivotally supporting said arms on said end plates at corresponding positions thereof displaced radially of said drive shaft, cam means fixed with respect to said frame adjacent one said end plates, said cam means having formed inwardly of a principal face thereof a guide channel adapted to receive a boss-like stub shaft therewithin, a boss-like stub shaft carried by and extending transversely of one of said arms, said stub shaft projecting into the cooperating said channel for guided movement therealong, said stub shaft being spaced axially along said arm with respect to corresponding said pivotal support means, walls of said channel serving as cam surfaces and said stub shaft serving as a cam follower, said channel defining a circuit path disposed transversely of and eccentric with respect to a longitudinal axis of said drive shaft;

whereby upon rotation of said shaft by said drive means said principal bar of said gathering means executes an orbit about said first resilient member, said orbit being eccentric with respect to said drive shaft.

16. The device as set forth in claim 4 and further comprising:

a drive shaft rotatably supported in said frame, end plates disposed transversely on said shaft at opposed ends thereof and fixed on said shaft for rotation therewith, means fastening said first resilient member onto said end plates, article gathering means of generally U-shaped configuration and comprising an elongated principal rod extending parallel to and spaced axially from said shaft, and a pair of arms joined to and extending generally transversely of said rod at opposed ends thereof, means pivotally supporting said arms on said end plates at corresponding positions thereof displaced radially of said drive shaft, a pair of cam means fixed with respect to said frame adjacent corresponding said end plates, each said cam means having formed inwardly of a principal face thereof a guide channel adapted to receive a boss-like stub shaft therewithin, a pair of boss-like stub shafts carried by and extending transversely of respective said arms, said stub shafts projecting into cooperating said channels for guided movement therealong, said stub shafts being spaced axially along said arms with respect to corresponding said pivotal support means, walls of said channels serving as cam surfaces and said stub shafts serving as cam followers, said channel defining circuit paths disposed transversely of and eccentric with respect to a longitudinal axis of said drive shaft;

whereby upon rotation of said shaft by said drive means said principal bar of said gathering means executes an orbit about said first resilient member, said orbit being eccentric with respect to said drive shaft.

17. The device as set forth in claim 16 wherein said channels in said cam means are generally circular in form and define a circuit path about said drive shaft, a radial center of the circuit path being out of coincidence with a radial center of said drive shaft.

18. The device as set forth in claim 17 wherein said radial center of said circuit path is displaced upwardly of said radial center of said drive shaft.

19. The device as set forth in claim 17 and further comprising a second drive shaft disposed laterally of and generally paralleling said first drive shaft, and means mounting said second resilient member on said second drive shaft.

20. The device as set forth in claim 19 wherein in executing said orbit about said first resilient member said bar of said gathering means sweeps in a plane parallel to and extending upwardly and outwardly from said drive shaft to direct articles into a zone adjacent said resilient members, and then sweeps downwardly and radially inwardly toward said first drive shaft to pass between said resilient members thereby completing a circuit about said first resilient member.

21. The device as set forth in claim 15 wherein said resilient members revolve at different linear speeds, the speed of said first member being less than the speed of the second member.

22. The device as set forth in claim 15 wherein as said first resilient member turns on its drive shaft, said article gathering means moves radially outward from said member and then back toward said member to describe an endless circuit path about and paralleling a principal axis of said drive shaft.

23. The device of claim 1 wherein said boom assembly includes a first boom section supported on said base and a second boom section substantially coaxial with said first section and telescopically slidably disposed therewithin, said device further comprising:

power line means extending from adjacent said base to a forward end of said boom assembly, a reel assembly associated with said power line means and effective to facilitate automatic take-up and pay-out of said power line means in response to concurrent extension and retraction of said boom assembly.

24. The device as set forth in claim 23 wherein said rel assembly comprises, in combination:

first anchoring means fastening said power line means to said first boom section for support thereon, first pulley means carried by said first boom section and engaging said power line means, second pulley means carried by said first boom section forwardly of said first pulley means and engaging said power line means, second anchoring means fastening said power line means to said second boom section, portions of said power line means intermediate points at which said power line means are fastened to said first and to said second boom sections being trained about said first and second pulley means for support thereon.

25. The device as set forth in claim 24 and further comprising power line means take-up and pay-out means to preclude accumulation of excess slack in said power line means intermediate points of attachment thereof to respective said sections of said boom assembly during relative reciprocal movement of said boom section.

26. The device as set forth in claim 25 wherein said take-up and pay-out means includes pulley support means for effecting linear reciprocal movement of one of said pulley means with respect to said first boom section, said reciprocal movement being correlated with and proportional to concurrent reciprocation of said first and second boom sections relative to one another.

27. The device as set forth in claim 23 wherein said reel assembly comprises:

first pulley means, means supporting said first pulley means on said first boom section for forward and rearward reciprocal movement relative thereto, pulley means mounted on said first boom section and fixed against linear movement relative thereto, cable means trained about the fixed pulley means and associated with said first pulley supporting means, and means fastening opposite ends of said cable means respectively to said first and to said second boom sections;

whereby said first pulley means moves forwardly and rearwardly longitudinally along said first boom section to take up and to pay out said power lines means as said second boom section reciprocates with respect to said first boom section.

28. The device as set forth in claim 27 wherein said take-up and pay-out means includes means to maintain said power line means tensioned as said boom sections move relative to one another.

29. The device as set forth in claim 27 wherein said means supporting said first pulley means on said first boom section comprises an elongated sleeve supported on said first boom section and extending generally parallel thereto, rod means coaxial with said sleeve and slidably supported therein for axial reciprocation, and means fastening said first pulley means to said rod means for movement therewith.

30. The device as set forth in claim 25 wherein said means for take-up and pay-out of said power line means comprises:

tube means mounted on said first boom section to extend therealong, rod means slidably disposed within said tube means for reciprocal axial movement with respect thereto, means fastening said first pulley means to said rod means for movement therewith, first and second cable guide means carried respectively by said rod means and said first boom section, cable means trained about said first and second cable guide means, and means fastening opposite ends of said cable means respectively to said first and second boom section;

whereby said first said pulley means moves forwardly and rearwardly with respect to said first boom section to effectuate pay-out and retraction of said power line means as said boom sections telescope relative to one another.

31. The device as set forth in claim 30 wherein said cable means is disposed to loop about said first and second cable guide means to define a cable cross-over point, an end of said cable means leading directly from said first cable guide means being fastened to said first boom section, an end of said cable means leading directly from said second cable guide means being fastened to said second boom section, said first pulley means being drawn rearwardly toward a rearward portion of said boom assembly as said second boom section moves axially forwardly of said first boom section;

whereby slack developed in said power cable means as said second boom section moves forwardly is taken up as said first pulley means away from said second pulley means.

References Cited

UNITED STATES PATENTS

| | | | |
|---|---|---|---|
| 2,131,672 | 9/1938 | Rich | 56—328 |
| 3,077,720 | 2/1963 | Grove et al. | 56—328 |
| 3,127,725 | 4/1964 | Richardson | 56—328 |
| 3,200,575 | 8/1965 | Hurst | 56—328 |
| 3,253,392 | 5/1966 | Barrat | 56—328 |
| 3,401,514 | 9/1968 | Clark | 56—328 |

RUSSELL R. KINSEY, Primary Examiner